United States Patent [19]

Sheppard

[11] 4,338,225

[45] Jul. 6, 1982

[54] HIGH PERFORMANCE RESIN REACTION PRODUCTS OF CARBOXYL TERMINATED 1,2-POLYBUTADIENE WITH EPOXIDES AND ACID TERMINATED DIFUNCTIONAL ALIPHATIC ALCOHOLS

[75] Inventor: Clyde H. Sheppard, Bellevue, Wash.

[73] Assignee: The Boeing Company

[21] Appl. No.: 175,259

[22] Filed: Aug. 4, 1980

[51] Int. Cl.$^3$ .................... C08F 283/10; C08G 59/14
[52] U.S. Cl. .................... 525/122; 525/502; 528/88; 528/93; 528/113; 528/115; 528/222; 528/339; 528/341; 528/361; 528/365; 528/336
[58] Field of Search .............. 525/122, 119, 502; 528/115, 339, 336, 341, 88, 93, 113, 222, 361, 365; 260/18 EP

[56] References Cited

U.S. PATENT DOCUMENTS

| | | | |
|---|---|---|---|
| 3,894,113 | 7/1975 | Pagel | 525/122 X |
| 3,931,354 | 1/1976 | Sheppard et al. | 525/122 |
| 4,016,022 | 4/1977 | Browning et al. | 156/285 |
| 4,107,116 | 8/1978 | Riew et al. | 260/23 EP |
| 4,119,592 | 10/1978 | Murphy | 528/112 |

OTHER PUBLICATIONS

"Handbook of Epoxy Resins", pp. 8 & 9, Lee and Neville, McGraw-Hill, N.Y. 1967.
Cram et al., Organic Chemistry, McGraw-Hill, New York, 1959, pp. 19, 23, 658, 659, 661 & 40.

Primary Examiner—Earl A. Nielsen
Attorney, Agent, or Firm—Delbert J. Barnard; Eugene O. Heberer; Joan H. Pauly

[57] ABSTRACT

A functionally terminated polybutadiene polymer is reacted with an epoxide to produce an epoxide terminated polybutadiene. A toughening agent and a peroxide free radical initiator are mixed with the epoxy terminated polybutadiene, and upon reaction a tough thermoset resin is produced having advanced chemical, electrical, and thermomechanical properties. Particular improvements are in the resistant-to-moisture and the tensile strain-to-failure properties.

13 Claims, No Drawings

HIGH PERFORMANCE RESIN REACTION PRODUCTS OF CARBOXYL TERMINATED 1,2-POLYBUTADIENE WITH EPOXIDES AND ACID TERMINATED DIFUNCTIONAL ALIPHATIC ALCOHOLS

The Government has rights in this invention pursuant to Contract No. F 33615-78-C-5170 awarded by the U.S. Air Force.

BACKGROUND OF THE INVENTION

U.S. Pat. No. 3,931,354 teaches that a chemically stable advanced composite could be made from a functionally terminated polybutadiene polymer that has been reacted with an epoxide and crosslinked with a bismaleimide crosslinking agent and a peroxide free radical initiator. The major advantages possessed by the compositions described in U.S. Pat. No. 3,931,354 are vacuum bag processing and resistance to moisture. Although the reference system solved the problem of resistance to high humidity environments, full scale development of the system has been retarded due to the undesirable characteristics of low transverse tensile strain-to-failure property. This property is one measurement of the resin toughness. Greater toughness is required in modern structural designs made from resins. Such structures are ailerons, aircraft tail assemblies, and radomes, for example. In these structures the resins are used as high performance binders for graphite, carbon fibers, boron filaments, and glassfiber reinforcements.

SUMMARY OF THE INVENTION

It was discovered that the low strain-to-failure property of the thermosetting resin matrix in U.S. Pat. No. 3,931,354 was caused by the shrinkage of the resin matrix during cure. This shrinkage was in turn determined to have been caused by the very high potential crosslink density due to the vinyl cure mechanism of the polybutadiene. According to the invention, it was surprisingly found that an effective mechanism for reducing the shrinkage was by dilution with acid terminated dialcohols and that they not only enhanced the strain-to-failure of the system but also substantially improved the resistance to moisture. This invention, thus, eliminates the use of the aromatic amine maleimide as required in the above patent.

Specifically, one such acid terminated alcohol is acid terminated ethylene glycol (ATEG). To produce an improved resin, according to the invention, a functionally terminated polydiene such as dicarboxy 1,2-polybutadiene and an acid terminated glycol (AETG) are reacted with a diepoxide to produce a mixture of an epoxy terminated polydiene and toughening agent. The epoxy terminated ingredients are then mixed with a conventional hardener, as a diamine such as diaminodiphenylsulfone and a peroxide free radical initiator which produces a viscous resin material having the peroxide homogeneously dispersed but substantially unreacted. By raising the temperature of the resin, the peroxide is activated to produce a hard thermoset resin.

Furthermore, the resin can be polymerized and crosslinked in situ to the cured state by one heating step. The polybutadiene polymer used in the production of the thermosetting resin of this invention should have a predominant amount of the olefinic unsaturation comprising the 1,2 or pendant vinyl configuration and preferably at least 80 percent of the olefinic unsaturation should be in the form of pendant vinyl groups or the 1,2 configuration of polybutadiene. While the molecular weights of these materials do not present a critical consideration, it is preferred that the molecular weights of the terminated polydiene range from approximately 500 to 5,000; however, with proper adjustments higher molecular weights may be used. With respect to the acid terminated glycols it is only required that the dialcohols used in preparation of the toughening agents be of aliphatic nature. The end properties of the resin will be controlled by the number of methylene groups in the dialcohol and/or diacid. Any anhydride may be used to obtain the carboxyl termination but again the more aliphatic the middle group, the tougher the resin will become.

The resin products of the invention possess the dry mechanical property equivalent to the high performance state-of-the-art epoxides. The resin products of this invention are made using vacuum bagging processing technology and in addition have the equivalent high strain-to-failure property of the state-of-the-art epoxides. As a bonus the hot wet property of the prior art (i.e. epoxides) is enhanced.

DESCRIPTION OF THE PREFERRED EMBODIMENTS

Preparation of Polydiene Adduct

To prepare an epoxide terminated polydiene adduct, a ratio of one equivalent weight of the functionally terminated 1,2-polybutadiene is reacted with two moles of a diepoxide at moderate temperatures. Although the polydiene and the diepoxide will react slowly at room temperature, temperatures of approximately 100° to 200° F. reduce the viscosity of the reactants and expedite the mixing and reaction of the polybutadiene with the epoxy.

Examples of diepoxide end-capping agents in which the unmodified epoxy groups are functionally active and suitable for the present invention are:

TABLE I

| epoxy novalacs |
| epichlorohydrin/bis phenol A-type |
| bis-epoxdicyclopntyl ether of ethylene glycol |
| 1-epoxyethyl-3,4-epoxcyclohexane |
| dicylopentadiene dioxide |
| limonene dioxide |
| bis (2,3-epoxypropoxy) benzene |
| vinylcyclohexane dioxide |
| 3,4-epoxy-6-methylcyclohexylmethyl-3,4-epoxy-6-methylcycohexanecarboxylate |
| zeaxathin diepoxide |
| 9,10 epoxy-12-hydroxyoctadecanoic acid triester of glycerol |

Generally, any difunctional aromatic or aliphatic epoxide will be suitable; for example, any alkylene epoxide, cycloalkylene epoxide, alkoxyarylene epoxide, arylene epoxide, alkycycloalkylene epoxide, cycloalkene epoxide, or alkyenecycloalkylene epoxide, can be used. Polymers made with aromatic epoxy end-caps generally exhibit better thermal stability than polymers made with aliphatic epoxy end-caps. In addition, the epoxy resin must be at least difunctional and, preferably, have a molecular weight above 500 to 700. The epoxy should be above the 500 to 700 molecular weight range so that reasonably high performance properties will be imparted to the final product. Lower molecular weights can be used, but the product properties tend to be closer to the polybutadiene characteristics. The epoxy resin must be at least difunctional so that a functionally reactive end-capped polybutadiene molecule is produced. Upon final cure of the epoxy end-capped polybutadiene molecule, the epoxy groups react with one another to produce a linear chain or block polymer.

End-capping is accomplished by mixing the ingredients under relatively moderate conditions. The end-capping can occur at room temperature; however, the time required for the step is materially reduced by increasing the temperature to a range of approximately 125° F. to 250° F. The reaction may be further accelerated by the inclusion of catalysts or epoxy accelerators.

Examples of some of the suitable catalysts or accelerators are as follows:

TABLE II tertiary aliphatic amines
$BF_3$—etherate
sodamide
zinc oxide
alkaline earth oxides
alkaline earth hydroxides
stannic chloride
sulfuric acid
diethyl zinc - water
trialkyl aluminum - chelating agent
ferrictrialkoxide
strontium amide
strontium alkoxide
calcium amide
calcium alkoxide
Other general and sterospecific polymerization catalysts may be determined by referring to a standard text relating to epoxide polymerization.

In another method, one equivalent weight of terminally difunctional 1,2-polybutadienediol may be reacted in a temperature range of between 75° F. to 200° F. with two equivalents of an organic anhydride to produce a polycarboxylic acid adduct which is subsequently end-capped with the epoxy resin. In this reaction, it is desirable to employ an equivalent amount of the dianhydride to alcohol substituents for the formation of the polycarboxylic acid adduct; however, an amount of anhydride in excess of equivalents may be used when adducts having reduced viscosities are sought.

Typical organic anhydrides which may be reacted with the dihydroxy-1,2-polybutadiene include:

TABLE III trimellitic anhydride
hexahydrophthalic anhydride
tetrachlorophthalic anhydride
tetrabromophthalic anhydride
nadic anhydride
methyl nadic anhydride
oxalic anhydride
azelaic anhydride
adipic anhydride
phthalic anhydride
pimelic anhydride
tetrahydrophthalic anhydride
chlorendic anhydride
maleic anhydride
succinic anhydride
suberic anhydride
sebacic anhydride
glutaric anhydride
malonic anhydride
Typical diahydrides which are suitable for use are:

TABLE IV 3,3',4,4'-benzophenone tetracarboxylic dianhydride
polyazelaic polyanhydride TABLE IV-continued pyromellitic dianhydride
pyromellitic dianhydride-glycol adducts
1,2,3,4-cyclopentanetetracarboxylic dianhydride
ends-cis bicyclo(2.2.1)-5-heptene-2,3-dicarboxylic dianhydride Acid adduct formation in the present invention is important for the purpose of increasing versatility in the polybutadiene. By end-capping the polybutadiene with an anhydride, such as trimellitic anhydride, the functionality of the polybutadiene may be easily changed from 2 to 4. Another advantage of the end-cap acid adduct is that the acid strength may be changed according to the type of anhydride used. Thus, rather than being limited to an aliphatic carboxylic group as when dicarboxylic 1,2-polybutadiene is used, the polybutadiene may be end-capped with an aromatic carboxylic acid group displaying different acid strengths. The advantage lies in the fact that increased acid strengths cause the polymerization reaction to occur more rapidly to reduce processing time.

Preparation of Toughening Agent

To prepare the epoxide terminated toughening agent a ratio of one equivalent weight of functionally terminated dialcohols (glycols) is reacted with two moles of a diepoxide at moderate temperatures. Although the acid terminated glycol and the diepoxide react slowly at room temperature, temperatures of approximately 100° F. to 200° F. reduce the viscosity of the reactants and expedite the mixing and reaction of the acid terminated glycol with the epoxy. The same diepoxide end capping-agents are described under end-capping of the carboxy terminated polydiene.

In another method the carboxy terminated polydiene and glycol may be first blended. The diepoxide is then blended into the mixture using one acid equivalent to two epoxide equivalents. The carboxy-epoxide reaction is then carried out as previously described.

Typical organic acids (anhydrides) which may be reacted with the dialcohols include:

TABLE V oxalic
malonic
succinic
glutaric
adipic
pimelic
suberic
azelaic
sebacic

Typical dialcohols which may be reacted with the organic acids and/or anydrides include:

TABLE VI ethylene glycol
diethylene glycol
propylene glycol
trimethylene glycol
pentamethylene glycol
hexamethylene glycol Preparation of the Resin Blend In the first method under toughening agent preparation, the epoxy-capped polydiene and epoxy-capped dialcohol are blended together. In the second method under the same, the carboxy terminated polydiene and carboxy terminated dialcohol are first mixed and then epoxy-capped prior to addition to the other ingredients. To vary the resin as desired, additional epoxide may be added. The epoxide may be different or the same one used for end-capping, in quantities between 10–70 percent by weight and mixed with epoxide hardeners using state-of-the-art epoxide formulary art (i.e. primary, secondary, tertiary amines, organic acids, and/or anhydrides).

The peroxide free radical initiator is incorporated into the prepolymer in either of the two ways previously described. In the method which forms the epoxy end-capped polymer for later fabrication, the peroxide, along with the epoxy hardener, is homogeneously dispersed throughout the mixture substantially unreacted. The amount of peroxide employed is generally in the range between approximately 0.5 to 10 percent by weight of the polymer; however, these amounts are not critical, as amounts of peroxide above 10 percent will be operative, but such large amounts of peroxide are undesirable from an economic standpoint. Amounts of peroxide below 0.5 percent will effect a reaction, but the reaction is usually sluggish and sometimes the product does not have the optimum properties attainable. Other factors dependent upon the amount of peroxide used may be the particular peroxide compound used, the polydiene, and the other reactants present. Approximately 2 to 5 percent by weight of the polymer are the amounts generally preferred for the peroxide. Thus, when the peroxide is heated in the range of approximately 300° to 425° F., the peroxide is activated, and the polymer is cured to a very hard thermoset resin having improved processability.

Organic peroxide free radical initiators suitable for use in this process may be selected from the following:

TABLE VII di-t-butyl peroxide
2,5-dimethyl-2,5-bis (tertiary butylperoxy) hexane
n-butyl-4,4-bis (tertiary butylperoxy) valerate
2,5-dimethyl, 2-5-bis (tertiary butylperoxy) hexane-3
tertiary-butyl perbenzoate
dicumyl peroxide
methyl ethyl ketone peroxide
cumene hydroperoxide
di-n-methyl-t-butyl percarbamate
lauroyl peroxide
acetyl peroxide
decanoyl peroxide
t-butyl peracetate
t-butyl peroxyisobutyrate Polymerization occurs when the aforementioned mixture is heated with the epoxy hardener crosslinking the polymer through reactions with the epoxy group and the peroxide curing through the pendant vinyl groups on the 1,2 polybutadiene.

The polymerization reaction occurs in a temperature range of between 280° F. and 400° F. At these temperatures the reaction is complete in between 10 minutes and 2 hours.

Reinforced composites can be made by impregnating fibers of boron, high modulus organic polymers, graphite, or glass first with solutions of the resin mixture, according to the invention, sometimes referred to as varnish. Next the impregnated fibers are dried to yield a prepreg having between 35 and 40 percent by weight solids. These prepregs are stacked then in a vacuum bag mold and cured at about 175° C. for an hour to yield a very strong composite having a low void content between the sheets, usually 1 percent by volume or less.

The following examples are presented to illustrate the various features of the invention, and are not intended to be limiting:

EXAMPLE I

Preparing ATEG

Approximately 793.7 grams of succinic anhydride and 206.3 grams of ethylene glycol were placed in a 50% solids solution with toluene in a 3 liter resin kettle equipped with a Dean Stark trap, a condenser, a mechanical stirrer, and a dry nitrogen purge. The mixture was heated in an oil bath to reflux temperature and refluxed for 2 hours. It was then removed from the heat, and the material rapidly separated into two liquid phases, the upper phase being colorless and the lower phase being yellow. The upper phase was removed and discarded by decanting. To the remaining material an excess of toluene was added and the solution was heated for 15 minutes. A two phase solution was again formed and the colorless upper phase was separated by decanting. The lower phase was then placed in an evaporating dish and allowed to cool. The remaining toluene was removed from the product by drying in a vacuum oven. For higher purity, the dried product was recrystallized from toluene using the same procedure as previously described. The melting point is between 70° and 75° C.

EXAMPLE II

Preparing ATHMG

Approximately 400 grams of succinic anhydride and 268 grams of hexamethylene glycol were placed in a 50% solids solution with toluene in a 3 liter resin kettle equipped with a Dean Stark trap, a condenser, a mechanical stirrer, and a dry nitrogen purge. The mixture was heated in an oil bath to reflux temperature and refluxed for 2 hours. It was then cooled to ambient conditions and the upper phase was removed by decanting. To the remaining material an excess of toluene was added and the solution was heated for 15 minutes. Again the upper phase was removed by decanting and the remaining material was dried in a vacuum oven. The melting point is between 90° and 100° C.

EXAMPLE III

Preparation of Thermoset Resin

| Formulation | Weight % |
|---|---|
| C 1000-dicarboxy 1,2-polybutadiene | 30.0 |
| ERE 1359-diepoxide | 14.0 |
| AMC-2-epoxide-carboxy reaction catalyst | 0.4 |
| DEN438-novolac epoxide | 32.8 |
| Eporal-diaminodiphenylsulfone (hardener) | 14.3 |
| Lupersol 101-peroxide free radical initiator | 5.1 |
| ATEG-acid terminated ethylene glycol | 3.4 |

Using the amounts above: C 1000 and AMC-2 were heated to 90° C. in a suitable mixer. In another container the ATEG was dissolved in the ERE 1359. This solution was then added to the hot C 1000 /AMC-2 mixer. An immediate exothermic reaction raised the temperature to a maximuum of 118° C. The mix was then cooled to 100° C. and reacted to constant viscosity. After preparation, the adduct was cooled to approximately 60° C. and the DEN438, Eporal, and Lupersol 101 were added and mixed. The mixture was milled two times on a three-roll paint mill and processed into graphite composites using conventional methods.

The properties of the composites were as shown below:

| Flexural Strength MPa | |
|---|---|
| at 20° C. | 1544 |
| at 149° C. | 841 |
| Flexural Modulus GPa | |
| at 20° C. | 119 |
| at 149° C. | 109 |
| Short Beam Shear MPa | |
| at 20° C. | 97 |
| at 148° C. | 42 |
| at 149° C. wet | 28 |
| 90° Tensile Strength MPa | |
| at 20° C. | 38 |
| 90° Tensile Modulus GPa | |
| at 20° C. | 7.4 |
| 90° Tensile Elongation (%) | 0.55 |

EXAMPLE IV

Preparation of Thermoset Resin

| Formulation | Weight % |
|---|---|
| C 1000-dicarboxy 1,2-polybutadiene | 26.2 |
| ERE 1359-diepoxide | 16.2 |
| AMC-2-epoxide-carboxy reaction catalyst | 0.4 |
| DEN438-novolac epoxide | 31.8 |
| Eporal-diaminodiphenylsulfone (hardener) | 13.9 |
| Lupersol 101-peroxide free radical initiator | 4.9 |
| ATHMG-acid terminated hexamethylene glycol | 6.6 |

Using the amounts above: in a suitable mixer the C1000 and ATHMG were heated to melt and thoroughly blended. The ERE-1359 and AMC-2 were added and reacted to constant viscosity at 90° C. After preparation, the adduct was cooled to approximately 60° C. and the remainder of the ingredients were added, mixed, and then milled two times on a three-roll paint mill and processed into graphite composites using conventional methods.

The properties of the composites were as shown below:

| Flexural Strength MPa | |
|---|---|
| at 20° C. | 1541 |
| at 149° C. | 669 |
| at 177° C. | 508 |
| Flexural Modulus GPa | |
| at 20° C. | 114 |
| at 149° C. | 95 |
| at 177° C. | 85 |
| Short Beam Shear MPa | |
| at 20° C. | 90 |
| at 149° C. | 35 |
| at 177° C. | 30 |
| at 177° C. wet | 17 |
| 90° Tensile at 20° C. | |
| Strength MPa | 29 |
| Modulus GPa | 10 |
| Elongation % | .35 |

EXAMPLE V

Comparison of Prior Art Control Formulation and Invention Toughened Systems

| | Compositions of Patent 3,931,354 | Invention Toughened Systems | | |
|---|---|---|---|---|
| | | 20% ATEG | 10% ATEG | 5% ATEG |
| Flexural Strength MPa | | | | |
| at 20° C. | 1384 | 1598 | 1543 | 1412 |
| at 149° C. | — | 682 | 840 | 834 |
| at 177° C. | 903 | 502 | — | — |
| Flexural Modulus GPa | | | | |
| at 20° C. | 109 | 118 | 119 | 112 |
| at 149° C. | — | 104 | 109 | 109 |
| at 177° C. | 107 | 90 | — | — |
| Short Beam Shear MPa | | | | |
| at 20° C. | 80 | 99 | 96 | 96 |
| at 149° C. | — | 37 | 42 | 48 |
| at 177° C. | 42 | 23 | — | — |
| at 149° C. wet | — | — | 28 | 34 |
| at 177° C. wet | 28 | 21 | — | — |
| 90° Tensile Properties at 20° C. | | | | |
| Tensile strength MPa | 23 | 37 | 38 | 41 |
| Tensile modulus GPa | 76 | 83 | 76 | 83 |
| Tensile elongation % | .31 | .47 | .55 | .51 |

What is claimed is:

1. A hard thermoset resin which is a reaction product of:
   one mole of 1,2-polybutadiene having more than one carboxyl terminal group;
   one mole of the reaction product of two moles of a difunctional aliphatic carboxylic acid or two moles of its anhydride, and one mole of a difunctional aliphatic alcohol;
   a minimum of 4 moles of an at least difunctional epoxide selected from the group consisting of epoxy novolacs, epichlorohydrin/bisphenol A-type, bis-epoxydicyclopentyl ether of ethylene glycol, 1-epoxyethyl-3,4-epoxycyclohexane, dicyclopentadiene dioxide, limonene dioxide, bis (2,3-epoxypropoxy) benzene, vinylcyclohexane dioxide, 3,4-epoxy-6-methylcyclohexylmethyl-3,4-epoxy-6-methylcyclohexanecarboxylate, zeaxanthin diepoxide, and 9,10-epoxy-12-hydroxyoctadecanoic acid triester of glycerol;
   an epoxide hardener to connect the polymer chains and produce an adequately crosslinked and satisfactorily thermoset resin; and
   a peroxide free radical initiator homogeneously dispersed throughout the reaction product.

2. A hard thermoset resin which is a reaction product of:
   a mole of 1,2-polybutadiene having more than one carboxyl terminal group;
   a mole of the reaction product of two moles of a difunctional aliphatic carboxylic acid or two moles of its anhydride, and one mole of a difunctional aliphatic alcohol;
   10 to 70 percent by weight of one or more of at least difunctional epoxide selected from the group consisting of epoxy novolacs, alkylene epoxide, cycloalkylene epoxide, alkoxyarylene epoxide, arylene epoxide, alkycycloalkylene epoxide, cycloalkene epoxide, and alkylenecycloalkylene epoxide;

an epoxide hardener to crosslink the polymer through reactions with the epoxide group; and a peroxide free radical initiator homogeneously dispersed throughout the reaction product.

3. A hard thermoset resin according to claim 1 or 2, wherein:

said difunctional aliphatic acid or its anhydride is selected from the group consisting of oxalic, malonic, succinic, glutaric, adipic, pimelic, suberic, azelaic, and sebaric; and said difunctional aliphatic alcohol is selected from the group consisting of ethylene glycol, diethylene glycol, propylene glycol, trimethylene glycol, pentamethylene glycol, and hexamethylene glycol.

4. A method of producing a hard thermoset polybutadiene-epoxy resin comprising:

mixing one mole of 1,2-polybutadiene having more than one carboxyl terminal group with an epoxide-carboxyl reaction catalyst;

mixing one mole of the reaction product of two moles of a difunctional aliphatic carboxylic acid or two moles of its anhydride and one mole of a difunctional aliphatic alcohol with a minimum of four moles of an at least difunctional epoxide selected from the group consisting of epoxy novolacs, alkylene epoxide, cycloalkylene epoxide, alkoxyarylene epoxide, arylene epoxide, alkycycloalkylene epoxide, cycloalkene epoxide, and alkylenecycloalkylene epoxide;

mixing the said mixes; and adding and mixing to the combined mixes an epoxide selected from the said group of epoxides, an epoxide hardener to crosslink the polymer through reactions with the epoxide group, and a peroxide free radical initiator.

5. The method according to claim 4 including:

milling the mixture, processing the milled product with reinforcements to make high strength composites.

6. The method according to claim 4 in which:

said difunctional aliphatic acid or its anhydride is selected from the group consisting of oxalic, malonic, succinic, glutaric, adipic, pimelic, suberic, azelaic, and sebaric; and said difunctional aliphatic alcohol is selected from the group consisting of ethylene glycol, diethylene glycol, propylene glycol, trimethylene glycol, pentamethylene glycol, and hexamethylene glycol.

7. A method of producing a polybutadiene-epoxy composite comprising:

reacting a mole of 1,2-polybutadiene having at least two carboxyl terminal groups, and one mole of the reaction product of two moles of a difunctional aliphatic carboxylic acid or two moles of its anhydride and one mole of a difunctional aliphatic alcohol, with 10 to 70 percent by weight of one or more of at least a difunctional epoxide selected from the group consisting of epoxy novolacs, alkylene epoxide, cycloalkylene epoxide, alkoxyarylene epoxide, arylene epoxide, alkycycloalkylene epoxide, cycloalkene epoxide, and alkylenecycloalkylene epoxide to form an epoxy terminated mixture;

mixing the epoxy terminated polydiene with an epoxide hardener to crosslink the polymer through reactions with the epoxide group; and a peroxide free radical initiator;

milling the mixture; and processing the milled mixture with reinforcements.

8. A method according to claim 7 wherein:

the dicarboxyl terminated groups are formed by the reaction of one equivalent of dihydroxy-1,2-polybutadiene with one equivalent of an acid anhydride selected from the group consisting of trimellitic anhydride; tetrahydrophthalic anhydride; hexahydrophthalic anhydride; tetrachlorophthalic anhydride, tetrabromophthalic anhydride; chlorendic anhydride, nadic anhydride; methyl nadic anhydride; maleic anhydride; oxalic anhydride; succinic anhydride; malonic anhydride; suberic anhydride; azelaic anhydride; sebacic anhydride; adipic anhydride; glutaric anhydride; pimelic anhydride; phthalic anhydride; 3,3',4,4'-benzophenone tetracarboxylic dianhydride; polyazelaic polyanhydride, pyromellitic dianhydride; pyromellitic dianhydride-glycol adducts; 1,2,3,4-cyclopentane tetracarboxylic dianhydride; and endo-cis bicyclo (2.2.1)-5-heptene-2,3-diacarboxylic dianhydride.

9. A hard thermoset resin according to claim 1 wherein:

the dicarboxyl terminated groups are formed by the reaction of one equivalent of dihydroxy-1,2-polybutadiene with one equivalent of an acid anhydride selected from the group consisting of trimellitic anhydride; tetrahydrophthalic anhydride; hexahydrophthalic anhydride; tetrachlorophthalic anhydride; tetrabromophthalic anhydride; chlorendic anhydride; nadic anhydride; methyl nadic anhydride; maleic anhydride; oxalic anhydride; succinic anhydride; malonic anhydride; suberic anhydride; azelaic anhydride; sebacic anhydride; adipic anhydride; glutaric anhydride; pimelic anhydride; phthalic anhydride; 3,3',4,4'-benzophenone tetracarboxylic dianhydride; polyazelaic polyanhydride; pyromellitic dianhydride; pyromellitic dianhydride-glycol adducts; 1,2,3,4-cyclopentane tetracarboxylic dianhydride; and endo-cis bicyclo (2.2.1)-5-heptene-2,3-diacarboxylic dianhydride.

10. A hard thermoset resin which is a reaction product of:

one mole of 1,2-polybutadiene having more than one carboxyl terminal group;

one mole of the reaction product of two moles of a difunctional aliphatic carboxylic acid or two moles of its anhydride, and one mole of a difunctional aliphatic alcohol; whereby the end properties of the resin are controlled by the number of methylene groups in the dialcohol and/or the diacid;

said difunctional aliphatic acid or its anhydride being selected from the group consisting of oxalic, malonic, succinic, glutaric, adipic, pimelic, suberic, azelaic, and sebaric;

said difunctional aliphatic alcohol being selected from the group consisting of ethylene glycol, diethylene glycol, propylene glycol, trimethylene glycol, pentamethylene glycol, and hexamethylene glycol;

a minimum of 4 moles of an difunctional epoxide selected from the group consisting of epoxy novolacs, alkylene epoxide, cycloalkylene epoxide, alkoxyarylene epoxide, arylene epoxide, alkycycloalkylene epoxide, cycloalkene epoxide, and alkylenecycloalkylene epoxide; the epoxide being at least difunctional to produce a functionally reactive end-capped polybutadiene molecule;

an epoxide hardener selected from the group consisting of primary, secondary, and tertiary amines, and organic acids or their anhydrides to crosslink the polymer through reactions with the epoxide group; and a peroxide free radical initiator homogeneously dispersed throughout the reaction product.

11. A hard thermoset resin which is a reaction product of:
   a mole of 1,2-polybutadiene having more than one carboxyl terminal group;
   a mole of the reaction product of two moles of a difunctional aliphatic carboxylic acid or two moles of its anhydride, and one mole of a difunctional aliphatic alcohol;
   10 to 70 percent by weight of one or more aromatic or aliphatic epoxide which is at least difunctional to produce a functionally reactive end-capped polybutadiene molecule;
   an epoxide hardener to crosslink the polymer through reactions with the epoxy group; and
   a peroxide free radical initiator homogeneously dispersed throughout the reaction product.

12. A polybutadiene-epoxy composite comprising:
   a thermosetting resin which is a reaction product of one mole of 1,2-polybutadiene having more than one carboxyl terminal group; one mole of the reaction product of two moles of a difunctional aliphatic carboxylic acid or two moles of its anhydride, and one mole of a difunctional aliphatic alcohol; 10 to 70 percent by weight of one or more of at least a difunctional epoxide selected from the group consisting of epoxy novolacs alkylene epoxide, cycloalkylene epoxide, alkoxyarylene epoxide, arylene epoxide, alkycycloalkylene epoxide, cycloalkene epoxide, and alkylenecycloalkylene epoxide; an epoxide hardener to crosslink the polymer through reactions with the epoxide group; and a peroxide free radical initiator homogeneously dispersed throughout the reaction; and
   reinforcement material in the composite being impregnated with the resin before it sets.

13. A composite according to claim 12 wherein:
   the dicarboxyl terminated groups are formed by the reaction of one equivalent of dihydroxy-1,2-polybutadiene with one equivalent of an acid anhydride selected from the group consisting of trimellitic anhydride; tetrahydrophthalic anhydride; hexahydrophthalic anhydride; tetrachlorophthalic anhydride; tetrabromophthalic anhydride; chlorendic anhydride; nadic anhydride; methyl nadic anhydride; maleic anhydride; oxalic anhydride; succinic anhydride; malonic anhydride; suberic anhydride; azelaic anhydride; sebacic anhydride; adipic anhydride; glutaric anhydride; pimelic anhydride; phthalic anhydride; 3,3',4,4'-benzophenone tetracarboxylic dianhydride; polyazelaic polyanhydride; pyromellitic dianhydride; pyromellitic dianhydride-glycol adducts; 1,2,3,4-cyclopentane tetracarboxylic dianhydride; and endo-cis bicyclo (2.2.1)-5-heptene-2,3-diacarboxylic dianhydride.

* * * * *

UNITED STATES PATENT AND TRADEMARK OFFICE
CERTIFICATE OF CORRECTION

PATENT NO. : 4,338,225
DATED : July 6, 1982
INVENTOR(S) : Clyde H. Sheppard

It is certified that error appears in the above-identified patent and that said Letters Patent are hereby corrected as shown below:

Column 8, line 41 (11th line of claim 1), "epichlorohydrin/bisphenol" should be --epichlorohydrin/bis phenol--.

Column 10, line 61 (20th line of claim 10), --at least-- should appear before "difunctional".

Signed and Sealed this

Third Day of January 1984

[SEAL]

Attest:

GERALD J. MOSSINGHOFF

Attesting Officer

Commissioner of Patents and Trademarks